Patented Aug. 9, 1938

2,126,455

UNITED STATES PATENT OFFICE 2,126,455

PROCESS FOR THE PREPARATION OF COPPER HALIDES

William Dettwyler, Milwaukee, Wis., assignor to E. I. du Pont de Nemours & Company, Wilmington, Del., a corporation of Delaware No Drawing. Application July 22, 1936, Serial No. 91,917

10 Claims. (Cl. 23—97)

This invention relates to a new and improved process for the preparation of copper halides. It relates more particularly to a method for preparing cuprous halides which are catalytically active, and which may be used for carrying out reactions where cuprous halides prepared by known methods have little or no effect.

Normally in the preparation of cuprous halides by the reaction of a halogen on copper the reaction is carried out in aqueous solutions or suspensions and it is difficult to obtain products in an exceedingly fine state of subdivision and in dry form without excessive atmospheric oxidation. Various methods have been devised for isolating the desired products from their solution to obtain them in pure form. It is found that cuprous halides so prepared when used as catalysts for organic chemical reactions are often ineffective to produce the results desired, apparently due in part to the physical state of the material obtained from water solutions as well as to its chemical constitution.

It is therefore an object of this invention to prepare cuprous halides in an extremly fine state of subdivision which are exceptionally active as catalysts for organic reactions requiring cuprous salts.

It is a further object of the invention to provide a new and improved process for the preparation of cuprous halides in a simple and economical manner, and wherein the hydrolysis and oxidation of the cuprous compound is eliminated.

I have found that finely divided copper can be reacted with halogens, such as chlorine, bromine and iodine, when suspended in organic solvents to give the cuprous halide in a very fine granular form which can be isolated directly from the anhydrous liquid in a very active state. Copper bronze or copper powder, preferably of a size which will pass through a hundred mesh screen or finer is suspended in an organic medium, such as nitrobenezene, halogenated benzenes, carbon tetrachloride, etc., and the halogen is then slowly added. In the case of bromine sufficient heat may be liberated to carry the reaction to completion, while with chlorine or iodine it is preferable to heat the mass to about 170° C. to insure complete reaction.

The cuprous halide resulting from the reaction of the finely divided copper and halogen is in an extremely fine state of subdivision. The reaction is carried out under agitation and the cuprous halides as formed from the particles of fine copper are apparently rendered even smaller than the particles of the copper powder itself, due possibly to the grinding action of the particles against each other and the wetting action of the solvent for the particles of cuprous halides as they are formed. The resulting cuprous salts are obtained directly from the solution by filtering, in most cases even without the necessity of washing the material with a more volatile solvent. When high boiling solvents are used the very fine granular cuprous halide may be freed therefrom by washing with benzene, ether, etc. The mass when dried is an extremely fine powder and requires no grinding.

The reaction is preferably carried out at temperatures above 60° C., for at temparatures below 50° C. the reaction is slow and some unchanged copper may remain in the final product. A small excess of halogen is preferably used to insure complete reaction.

The term "organic solvents" is used not to cover solvents for the copper or the reaction products, but in the technical sense of defining a class of organic materials usually employed as solvents in organic chemistry. Any organic liquid, preferably inert to the action of halogen under the conditions of the reaction, may be employed as long as it has a boiling point sufficiently high to permit attaining the temperature necessary to complete the reaction. The preparation of the cuprous halides may be carried out in organic medium which itself may be halogenated, for the resulting cuprous halides can be separated therefrom by direct filtration. It is therefore not necessary that the medium be inert to the action of chlorine insofar as the preparation of the cuprous halide is concerned, when sufficient halogen is used to completely convert all of the copper present to the cuprous halide.

The following examples are given to more definitely illustrate the invention. The parts used are by weight.

Example 1

To a suspension of 100 parts copper powder (200 mesh) in 500 parts orthodichlorobenzene, there is slowly added under agitation 150 parts bromine over a period of 3 hours. The temperature of the mass will gradually rise to 50–60° C. The temperature is then raised to 175° C. and held ½ hour. The mass is cooled, filtered, and the cuprous bromide is dried. It is obtained in theoretical yields, and exhibits excellent catalytic properties.

Example 2

To 100 parts copper powder (200 mesh) suspended in 500 parts orthodichlorobenzene at 160° C. is slowly added under agitation a solution of 150 parts bromine in 200 parts orthodichlorobenzene over a period of 2 to 3 hours. The mass is then heated to 175° C. and held ½ hour. It is then cooled and filtered. A quantitative yield of cuprous bromide is thus obtained.

*Example 3*

Into a suspension of 100 parts copper powder (300 mesh) in 500 parts nitrobenzene, chlorine gas is slowly added under vigorous agitation until all copper is converted to the cuprous chloride as indicated by the fact that no more chlorine is used up. The reaction mass is then heated to 175° C. for ½ hour and cooled. The cuprous chloride is filtered off and sucked dry. The conversion of the copper is quantitative and the resulting product is pure cuprous chloride in an extremely finely divided form.

The chlorination can also be effected at 160–170° C. with identical results.

*Example 4*

A mixture of 100 parts copper powder and 200 parts iodine in 1000 parts orthodichlorobenzene is heated slowly under agitation to 175° C. and held 1 hour. The mass is then cooled to room temperature and the cuprous iodide isolated by filtration. It is obtained in a theoretical yield.

The amount of solvent used may be varied within wide limits since the speed of the reaction will depend to a great extent upon the concentration of the unreacted halogen present in the solvent. When the copper is suspended in too small an amount of solvent the reaction may become violent particularly if the halogen is added too rapidly, making the use of larger volumes of solvent desirable. Where the reaction is to be carried out at temperatures below 100° C. the organic liquid employed should be free from water. Where higher temperatures are used it is not necessary to start the anhydrous solvents since they are rendered such during the reaction.

On filtering off the resulting cuprous halides the solvent may be used over again, since neither the copper nor the resulting copper salts are soluble in such solvents as nitrobenezene, trichlorobenzene, benzene, carbon tetrachloride, etc.

These cuprous halides are particularly active as catalysts in the preparation of indanthrone compounds, as more particularly described in copending application Serial No. 91,918 filed of even date herewith.

I claim:

1. The process for preparing cuprous halides which comprises reacting upon a finely divided form of copper suspended in an organic liquid with a halogen, under such conditions that cuprous halide is formed, the organic liquid employed as the reaction medium being one which is not acted upon by halogen under the conditions of this reaction.

2. The process for preparing cuprous halides which comprises suspending a finely divided form of copper in a liquid organic medium which does not react with halogen and adding sufficient halogen to react with all of the copper present under agitation and under such conditions that cuprous halide is formed.

3. The process for preparing cuprous halides which comprises suspending a finely divided form of copper in a liquid organic medium which does not react with halogen and adding sufficient halogen to react with all of the copper present under agitation and under such conditions that cuprous halide is formed and isolating the resulting cuprous halide by filtering and drying.

4. The process for preparing cuprous chloride which comprises suspending a finely divided form of copper in a liquid organic medium which does not react with chlorine and adding sufficient chlorine to react with all of the cooper present under agitation and under such conditions that cuprous chloride is formed.

5. The process for preparing cuprous bromide which comprises suspending a finely divided form of copper in a liquid organic medium which does not react with bromine and adding sufficient bromine to react with all of the copper present under agitation and under such conditions that cuprous bromide is formed.

6. The process for preparing cuprous iodide which comprises suspending a finely divided form of copper in a liquid organic medium which does not react with iodine and adding sufficient iodine to react with all of the copper present under agitation and under such conditions that cuprous iodide is formed.

7. A cuprous halide in a finely divided powder form which exhibits higher catalytic effect in the indanthrone reaction than the cuprous halide prepared in aqueous solutions, being identical with the product obtained by the process of claim 2.

8. A cuprous chloride in a finely divided powder form which exhibits higher catalytic effect in the indanthrone reaction than the cuprous chloride prepared in aqueous solutions, being identical with the product obtained by the process of claim 4.

9. A cuprous bromide in a finely divided powder form which exhibits higher catalytic effect in the indanthrone reaction than the cuprous bromide prepared in aqueous solutions, being identical with the product obtained by the process of claim 5.

10. A cuprous iodide in a finely divided powder form which exhibits higher catalytic effect in the indanthrone reaction than the cuprous iodide prepared in aqueous solutions, being identical with the product obtained by the process of claim 6.

WILLIAM DETTWYLER.